United States Patent
Kaneko

[11] Patent Number: 6,085,388
[45] Date of Patent: Jul. 11, 2000

[54] OPERATING DEVICE FOR OPENABLE AND CLOSABLE STRUCTURE

[75] Inventor: Takayuki Kaneko, Kanagawa, Japan

[73] Assignee: Katoh Electrical Machinery Co., Ltd., Kanagawa, Japan

[21] Appl. No.: 09/062,955

[22] Filed: Apr. 20, 1998

[30] Foreign Application Priority Data

Apr. 21, 1997 [JP] Japan ................................. 9-103703

[51] Int. Cl.$^7$ .................................................. E05C 17/64
[52] U.S. Cl. .................................. 16/338; 16/342; 16/274
[58] Field of Search ............................. 16/338, 342, 337, 16/274, 273

[56] References Cited

U.S. PATENT DOCUMENTS

| | | | |
|---|---|---|---|
| 1,097,741 | 5/1914 | Voight | 16/274 |
| 1,433,095 | 10/1922 | Peary | 16/274 |
| 2,260,403 | 10/1941 | Preston | 16/338 |
| 4,490,884 | 1/1985 | Vickers | 16/338 |
| 5,598,607 | 2/1997 | Katagiri | 16/338 |
| 5,632,066 | 5/1997 | Huong | 16/338 |
| 5,682,645 | 11/1997 | Watabe et al. | 16/338 |

FOREIGN PATENT DOCUMENTS 87624 10/1959 Denmark ................. 16/338

*Primary Examiner*—Chuck Y. Mah
*Attorney, Agent, or Firm*—Notaro & Michalos P.C.

[57] ABSTRACT

A small operating device for an openable and closable structure is disclosed which can provide a large friction torque and in which the friction torque can be adjusted. The operating device comprises a rotating shaft; a holder encasing the outer circumference of the rotating shaft axially and having formed therein a bearing hole which is radially reducible in diameter;

an adjusting screw to adjust the diameter of the bearing hole in the holder; and an inner race fitted between the bearing hole in the holder and the rotating shaft and placed in axial contact with the outer circumference of the rotating shaft and radially reducible in diameter.

3 Claims, 3 Drawing Sheets

OPERATING DEVICE FOR OPENABLE AND CLOSABLE STRUCTURE

BACKGROUND OF THE INVENTION

1. Field of the Invention

The present invention relates to an operating device suitably usable with an openable and closable structure such as various types of display panels of lap-top type personal computers, word processors or the like, various doors, lids, covers or the like to open and close, say, operate the openable and closable structure.

2. Description of the Prior Art

Operating devices of this kind are well known in which a rotating shaft is supported rotatably in a bearing hole formed in a bearing plate of a fixing member, there is fixed to the rotating shaft rotatably along with the latter a friction washer which will be pressed to a bearing of the fixing member or a plain washer fixed to the bearing to cause the rotating shaft to generate a friction torque, an openable and closable structure is fixed to the rotating shaft by means of a supporting member so that it can be stopped and held at a desired angle.

For a larger friction torque, however, the torque of calking the rotating shaft should be increased, a friction washer of a larger diameter should be used, or more friction washers should be used. In any case, the calking torque is limited or the operating device itself should be designed larger to attain the larger friction torque. Also, in a conventional operating device designed to provide a friction torque by calking the rotating shaft, once the rotating shaft is calked, the friction torque would not be adjustable any longer.

SUMMARY OF THE INVENTION

Accordingly, the present invention has an object to overcome the above-mentioned drawbacks of the prior art by providing a small operating device for an openable and closable structure, adapted to provide a large friction torque and adjust the friction torque.

The above object can be accomplished by providing an operating device comprising, according to the present invention, a rotating shaft, a holder encasing the outer circumference of the rotating shaft axially and having formed therein a bearing hole which is radially reducible in diameter, an adjusting screw to adjust the diameter of the bearing hole in the holder, and an inner race fitted between the bearing hole in the holder and the rotating shaft and placed in axial contact with the outer circumference of the rotating shaft and radially reducible in diameter.

According to an aspect of the present invention, the holder can be fixed to a fixing member to be secured to the body of an equipment with which the operating device of the present invention is to be used, and the supporting member of the openable and closable structure can be fixed to the rotating shaft.

According to another aspect of the present invention, there is formed in the inner wall of the inner race a plurality of oil traps, and the oil traps may be formed from a plurality of concavities or small holes.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE PREFERRED EMBODIMENTS

Figure 1:
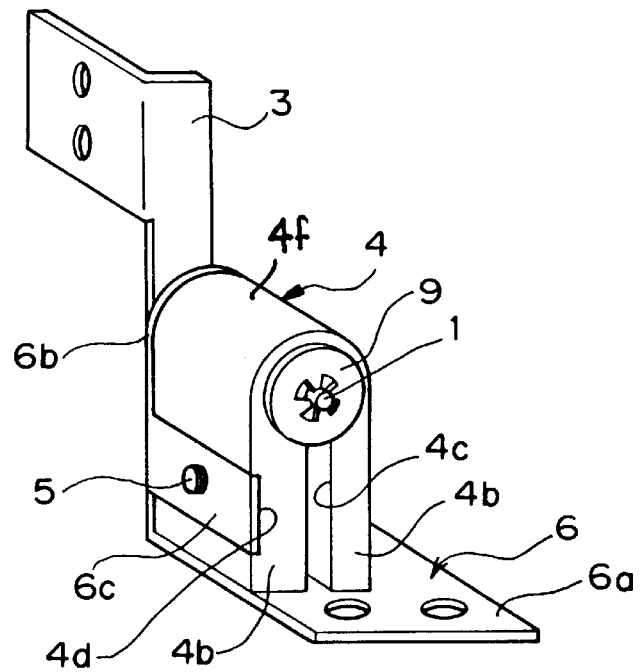
FIG. 1 is a perspective view of the operating device for an openable and closable structure according to the present invention.
Figure 2:
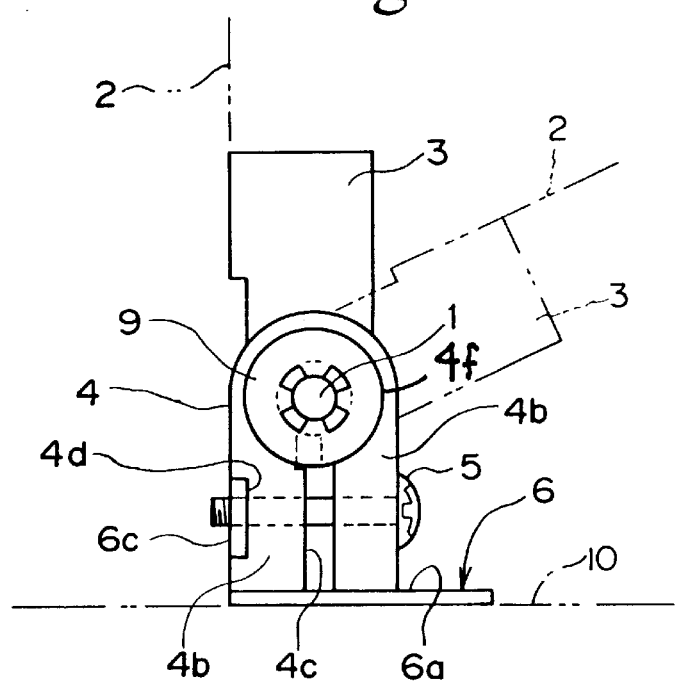
FIG. 2 is a side elevation of the operating device of the present invention.
Figure 3:
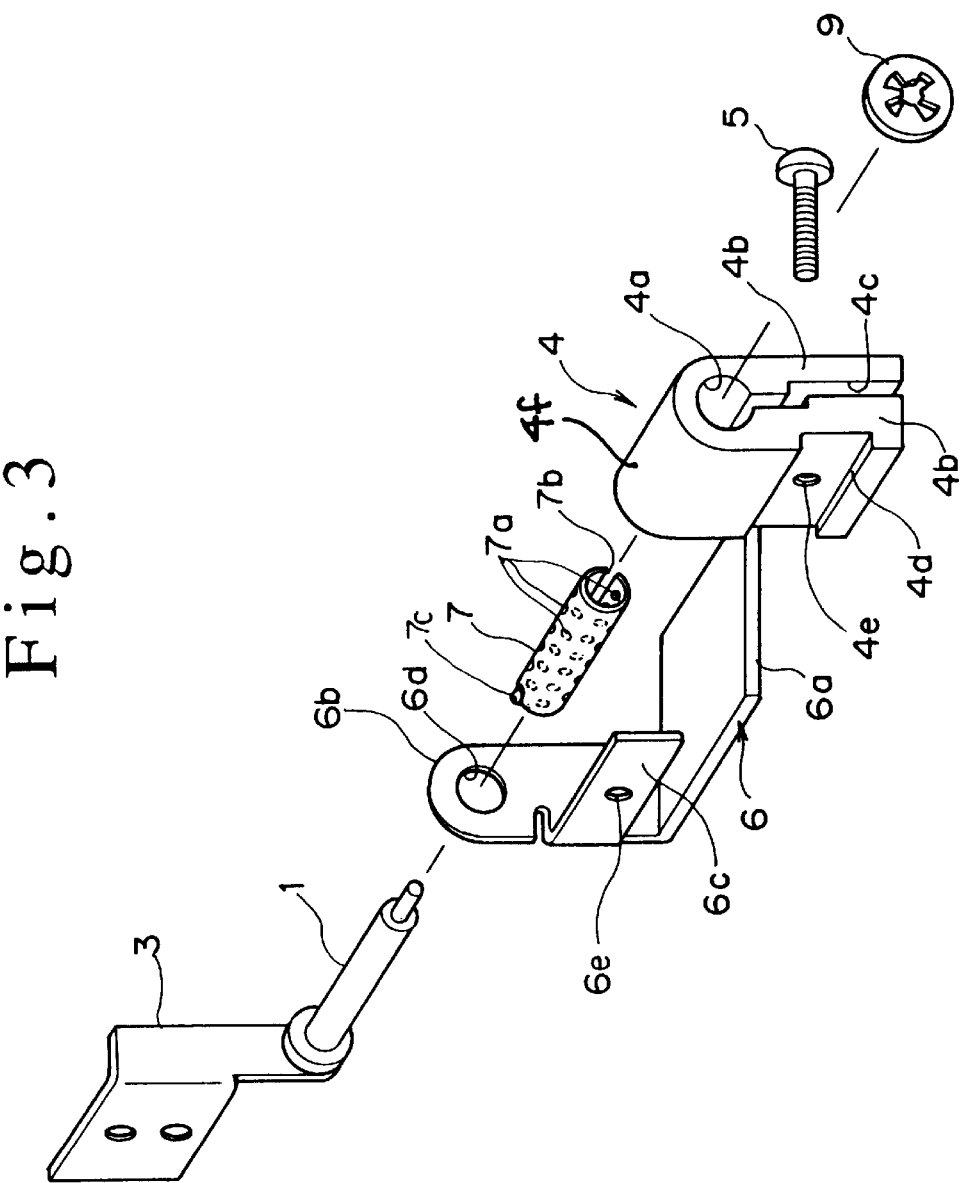
FIG. 3 is an exploded perspective view of the operating device of the present invention.

The accompanying drawings show one of the preferred embodiments of the present invention. The operating device comprises a rotating shaft generally indicated with a reference 1. The rotating shaft 1 has fixed to one end thereof a supporting member 3 of an openable and closable structure 2 such as a display panel or the like of an office automation equipment, for example. A holder 4 having a bearing sleeve portion 4f is provided to encase the outer circumference of the rotating shaft 1 axially. Bearing sleeve portion 4f has an axially elongated and it has a bearing hole 4a formed therein. The holder 4 has also formed therein an expanding slit 4c extending from outside the holder 4 to the bearing hole 4a. Thus, the remainder, except around the bearing holder 4a, of the holder 4 are formed as separately extending portions 4b through which holes 4e are formed, respectively. One of the separate extending portions 4b is concaved 4d. An adjusting screw 5 is introduced through the screw holes 4e. By tightening or loosening the adjusting screw 5 penetrated through the screw hole 4e, the diameter of the bearing hole 4a can be adjusted.

A fixing member 6 is provided to fix the holder 4. It has a base plate 6a, a bearing plate 6b standing from the base plate 6a, and a fixing plate 6c formed as bent 90° with respect to the bearing plate 6b. The bearing plate 6b has a bearing hole 6d formed therein, and the fixing plate 6c has a screw hole 6e formed therein. The fixing member 6 is to be secured at the base plate 6a thereof to a body 10, at which a keyboard is provided, of a small personal computer, word processor or a similar OA equipment indicated with an imaginary line in Figures. After the holder 4 is mounted on the base plate 6a of the fixing member 6 in such a manner that it abuts the bearing plate 6b and the fixing plate 6c is fitted in the concavity 4d formed in one of the above-mentioned separately extending portions 4b of the holder 4, the adjusting screw 5 penetrated through the holes 4e in the extending portions 4b is driven into the screw hole 6e in the fixing plate 6c, to thereby securely fix the holder 4 to the fixing member 6. The fixing member 6 adapted as in this embodiment is advantageous in that the holder 4 can be fixed securely and held stably to the fixing member 6. However, it should be noted that the fixing member 6 may be omitted by fixing one of the separately extending portions 4 directly to the equipment body 10. In this case, the adjusting screw 5 will be penetrated through the hole 4e in one of the extending portion 4b of the holder 4 and driven into a screw hole formed in the other extending portion instead of the hole 4e. Also, the installation and shape of the bearing plate 6b and fixing plate 6c of the fixing member 6 are not limited only to those in this embodiment.

Figure 4:
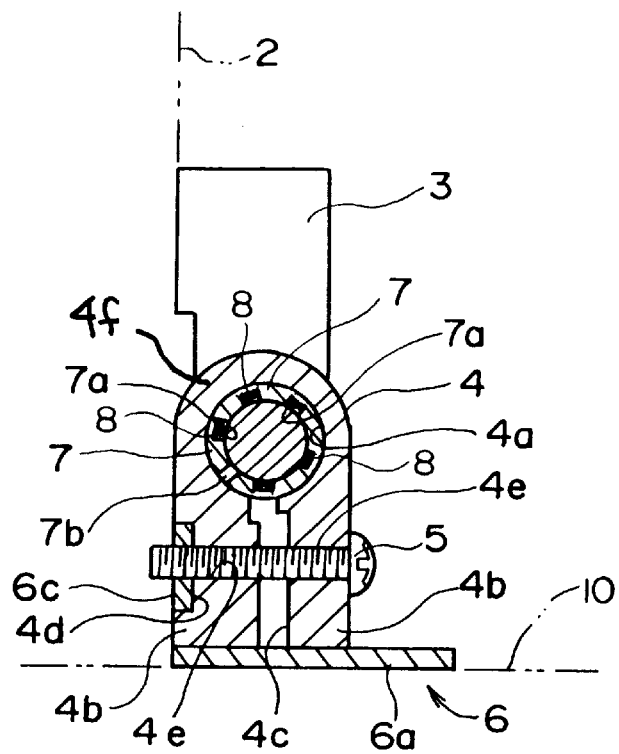
FIG. 4 is a side elevation of the operating device of the present invention.
Figure 5:
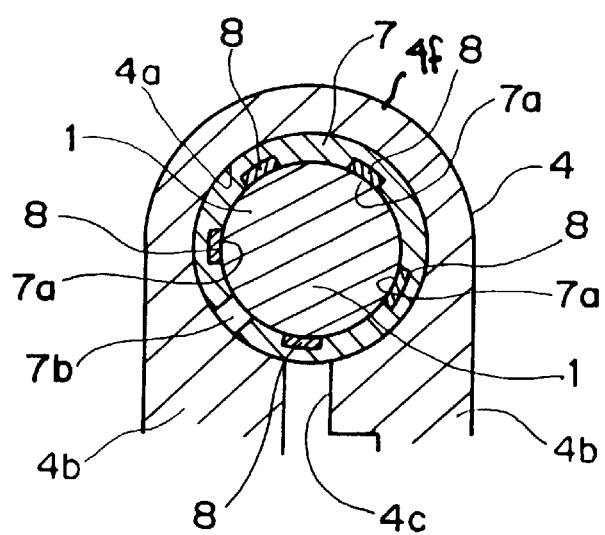
FIG. 5 a partially fragmentary sectional view, enlarged in scale, for explanation of the oil traps formed in the operating device according to the present invention.

Also an inner race 7 is provided which has an expanding hole 7b formed axially thereof. When installed in place, the inner race 7 is to be in axial contact with the outer circumference of the rotating shaft 1. The inner race 7 has formed therein many oil traps 7a formed from a plurality of concavities. As shown in FIGS. 4 and 5, a lubricant 8 such as silicon oil is filled between the inner wall of the inner race 7 and the outer circumference of the rotating shaft 1, and a part of the lubricant 8 stays in the oil traps 7a. It should be noted that the oil traps 8 may be formed from a plurality of small holes instead of the concavities. In this embodiment, the inner race 7 is made of a metal or synthetic resin. However, it should be noted that the inner race 7 may be made of an oil-impregnated metal or synthetic resin. That is to say, the inner race 7 may be used with or without an oil. A push nut 9 is fitted on a portion of the rotating shaft 1 projecting out of the holder 4 to prevent the rotating shaft 1 from being disengaged from the holder 4 as well as for positioning the rotating shaft. 1. Further there is formed on one end portion of the inner race 7 an engagement projection 7c which is protruded radially of the inner race 7. The engagement projection 7c is to be engaged in an engagement concavity (not shown) formed in the edge of the axially elongated bearing hole 4a of the holder 4.

Therefore, as the adjusting screw 5 is tightened or loosened, the space between the separately extending portions 4b of the holder 4 is decreased or increased so that the diameter of the axially elongated bearing hole 4a is changed correspondingly. The inside diameter of the inner race 7 will also change correspondingly. Thus, the friction of the rotating shaft 1 with the inner wall of the holder 4 can be adjusted, which will lead to an adjustment of the rotation torque of the rotating shaft 1.

Since the rotating shaft 1 is in axial contact with the inner race 7 and will thus have a wide area of friction with the inner wall of the inner race 7. Therefore, a large friction torque can be assured even with the small operating device of the present invention.

The plurality of oil traps 7a formed in the inner race will minimize an abrasion of the rotating shaft 1 and suppress an abnormal operating sound, which will take place when the operating device has been used for many years.

What is claimed is:

1. An operating device for an openable and closable structure, comprising:

a fixing member having a base plate, a bearing plate bent perpendicular from the base plate and having a bearing hole, and a fixing plate bent perpendicular from the bearing plate;

a holder attached to the fixing plate of the fixing member via an adjusting screw, the holder having an axially elongated bearing hole which is radially reducible in diameter;

a rotating shaft carrying a support member attached to one end portion thereof, the rotating shaft penetrating the bearing hole of the bearing plate and the axially elongated bearing hole of the holder;

an inner race fitted between the outer circumference of the rotating shaft and the wall of the axially elongated bearing hole of the holder and fixed to the holder, the inner race being radially reducible in diameter; and a plurality of oil traps provided on the inner race.

2. An operating device for an openable and closable structure, comprising:

a fixing member having a base plate, a bearing plate bent perpendicular from the base plate and having a bearing hole, and a fixing plate bent perpendicular from the bearing plate;

a holder having a bearing sleeve portion with an axially elongated bearing hole, an extending portion extended outward from the bearing sleeve portion, and an expanding slit formed to extend from the extending portion toward the axially elongated bearing hole;

an adjustment screw capable of fixing the extending portion of the holder to the fixing plate of the fixing member and of radially reducing the axially elongated bearing hole via the elongated portion simultaneously with the fixing plate;

a rotating shaft carrying a support member attached to one end portion thereof, the rotating shaft penetrating the bearing hole of the bearing plate and axially elongated bearing hole of the holder;

an inner race fitted between the outer circumference of the rotating shaft and the wall of the bearing hole of the holder and fixed to the holder, the inner race being radially reducible in diameter; and a plurality of oil traps provided on the inner race.

3. An operating device for an openable and closable structure, comprising:

a fixing member having a base plate, a bearing plate bent perpendicular from the base plate and having a bearing hole, and a fixing plate bent perpendicular from the bearing plate;

a holder having a bearing sleeve portion with an axially elongated bearing hole, an extending portion extended outward from the bearing sleeve portion, and an expanding slit formed to extend from the extending portion toward the axially elongated bearing hole;

an adjustment screw capable of fixing the extending portion of the holder to the fixing plate of the fixing member and of radially reducing the axially elongated bearing hole simultaneously with the fixing plate;

a rotating shaft carrying a support member attached to one end portion thereof, the rotating shaft penetrating the bearing hole of the bearing plate and the axially elongated bearing hole of the holder, and a push nut being attached to the other end portion of the rotating shaft exposed from the holder;

an inner race fitted between the outer circumference of the rotating shaft and the wall of the axially elongated bearing hole of the holder and fixed to the holder, the inner race having an axially expanding slit, so that the inner race is radially reducible in diameter; and a plurality of oil traps provided on the inner race, the oil traps being formed from a plurality of small holes or concavities.

* * * * *